United States Patent
Miller

(10) Patent No.: US 6,271,648 B1
(45) Date of Patent: Aug. 7, 2001

(54) METHOD OF PRECONDITIONING A BATTERY TO IMPROVE COLD TEMPERATURE STARTING OF A VEHICLE

(75) Inventor: John Michael Miller, Saline, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/671,714

(22) Filed: Sep. 27, 2000

(51) Int. Cl.$^7$ .............................. H02J 7/00; H05B 1/00
(52) U.S. Cl. ..................... 320/150; 320/129; 219/201
(58) Field of Search ........................ 320/150, 139, 320/127, 128, 130, 129; 219/201, 202

(56) References Cited

U.S. PATENT DOCUMENTS

| | | | |
|---|---|---|---|
| 5,039,927 | * 8/1991 | Centafanti | 320/128 |
| 5,362,942 | * 11/1994 | Vanderslice, Jr. et al. | 219/209 |
| 5,990,660 | * 11/1999 | Meissner | 320/127 |
| 5,990,661 | * 11/1999 | Ashtiani et al. | 320/128 |
| 6,072,301 | * 6/2000 | Ashtiani et al. | 320/128 |

* cited by examiner

Primary Examiner—Peter S. Wong
Assistant Examiner—Gregory J. Toatley, Jr.
(74) Attorney, Agent, or Firm—Ford Global Tech., Inc

(57) ABSTRACT

A method of preconditioning a battery 34 of a hybrid electric vehicle 10 to improve cold temperature starting of vehicle 10. The method utilizes the vehicle's electric starter/generator 16 to generate forward and reverse torque pulsations which draw power from battery 34, thereby heating the core of battery 34. The forward and reverse torque pulsations are further effective to rock the engine crankshaft 18, thereby eliminating static friction and reducing the torque required to crank engine 14.

18 Claims, 3 Drawing Sheets

METHOD OF PRECONDITIONING A BATTERY TO IMPROVE COLD TEMPERATURE STARTING OF A VEHICLE

FIELD OF THE INVENTION

This invention relates to a method of preconditioning a battery to improve cold temperature starting of a vehicle and more particularly, to a method of preconditioning a battery to improve cold temperature starting of a hybrid electric vehicle which selectively operates the vehicle's integrated starter/generator to heat the core of the battery prior to starting the vehicle.

BACKGROUND OF THE INVENTION

Hybrid electric vehicles ("HEVs") utilize both an internal combustion engine and one or more electric machines (e.g., motors/generators) to generate power and torque. The electric motor/generator within a hybrid electric vehicle provides the vehicle with additional degrees of freedom in delivering the driver-demanded torque and is also typically used to start the vehicle's engine.

One type of hybrid electric vehicle utilizes an integrated starter/alternator or starter/generator which functions as both a motor and a generator. The starter/generator typically provides a variety of functions and benefits, including but not limited to starting the vehicle's engine; generating and providing electrical power to vehicle systems and components; providing additional torque to the vehicle's engine during heavy accelerations; assisting in and/or performing the braking functions of the vehicle, thereby capturing the kinetic energy of the moving vehicle; and stopping or "shutting off" the vehicle's engine during idling and decelerating states or conditions, thereby improving the vehicle's overall fuel economy.

In order to start the vehicle's engine, the starter/generator receives power from an onboard electrical power supply such as a battery. In one type of hybrid electric vehicle, a rechargeable forty-two volt (42 V) battery, such as a lead acid or nickel-metal-hydride battery, is used to supply electrical power to the starter/generator. While these types of batteries are often effective to provide the requisite electrical charge to power the starter/generator, they suffer from some drawbacks.

For example and without limitation, during cold temperature starting conditions, these batteries provide only limited performance. The power pulse capability for a typical forty-two volt battery at −20 degrees Celsius is often less than fifty percent of its power pulse capability at 20 degrees Celsius. Therefore, if a typical forty-two volt battery is sized to meet cost and weight constraints, it may have marginal cold temperature pulse discharge performance and may be unable to meet engine cranking loads.

Efforts have been made to overcome the cold temperature starting limitations associated with these types of batteries. These efforts include utilizing different battery technologies in parallel, self-heating the battery core by use of resistive elements, and providing an auxiliary climate control system for the battery. These efforts, however, have not produced satisfactory results. For example, the utilization of different battery technologies requires additional costly and complex electronics to address battery management issues. Furthermore, the use of resistive elements and auxiliary climate control systems results in an excessive amount of battery self-discharge which adversely impacts the fuel economy gains that are provided by the starter/generator.

There is therefore a need for a method of preconditioning a battery to improve cold temperature starting of a hybrid electric vehicle which overcomes the drawbacks of prior methods, strategies and systems.

SUMMARY OF THE INVENTION

It is a first object of the invention to provide a method of preconditioning a battery to improve cold temperature starting of a hybrid electric vehicle which overcomes at least some of the previously delineated drawbacks of prior emissions reducing methods and strategies.

It is a second object of the invention to provide a method of preconditioning a battery to improve cold temperature starting of a hybrid electric vehicle which selectively operates the vehicle's starter/generator to heat the battery core.

It is a third object of the invention to provide a method of improving cold temperature starting of a hybrid electric vehicle which utilizes the vehicle's starter/generator to remove static friction within the vehicle's engine, thereby reducing the torque required to start the engine.

It is a fourth object of the invention to provide a method of preconditioning a battery to improve cold temperature starting of a hybrid electric vehicle which provides for a faster application of fuel and spark within the engine.

According to a first aspect of the present invention, a method is provided for improving cold temperature starting of a vehicle having a battery, an engine, and an electric machine which is coupled to the battery and which is attached to the crankshaft of the engine. The method includes the steps of: detecting a cold temperature starting condition; and selectively providing torque pulsations to the crankshaft by use of the electric machine during the cold temperature starting condition, the torque pulsations being effective to draw power from the battery effective to heat the battery and to remove static friction within the engine, thereby reducing the torque required to crank the engine.

According to a second aspect of the present invention, a method of preconditioning a battery is provided. The battery is disposed within a vehicle having an engine and a starter/generator which is operatively coupled to the battery and the engine. The method includes the steps of: detecting a cold temperature starting condition; and selectively activating the starter/generator effective to draw power from the battery, thereby heating the battery, the selective activation of the starter/generator being further effective to generate torque pulsations which remove static friction within the engine, thereby reducing the torque required to crank the engine.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
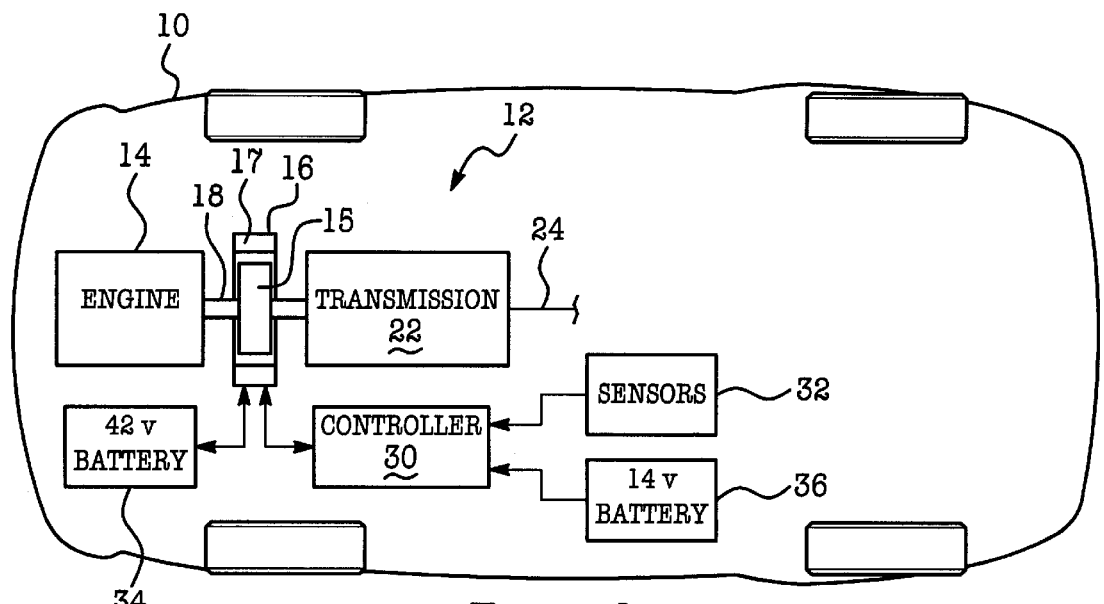
FIG. 1 is a block diagram of a hybrid electric vehicle which employs a battery preconditioning strategy which is performed in accordance with the teachings of a preferred embodiment of the present invention.

Referring now to FIG. 1, there is shown a vehicle 10 having a propulsion or drive system 12 that utilizes a cold temperature battery preconditioning strategy that is performed in accordance with the teachings of the preferred embodiment of the present invention. Drive system 12 includes an internal combustion engine 14; an electric machine or integrated starter/generator 16, which is operatively coupled, either directly or via belt, chain or some type of transmission, to crankshaft 18, and to a first conventional charge storage device or battery 34; and a controller or control unit 30, which is communicatively coupled to starter/alternator 16 and to conventional vehicle operating sensors 32. Controller 30 is further coupled to a second charge storage device or battery 36. In the preferred embodiment of the invention, battery 34 comprises a conventional forty-two volt (42 V) nickel-metal-hydride battery and battery 36 comprises a conventional fourteen volt (14 V) battery which provides power to controller 30 when vehicle 10 is "turned off" or is not running. As should be appreciated by one of ordinary skill in the art, drive system 12 is a serial type propulsion system. It should further be appreciated that in alternate embodiments, propulsion system 12 may be arranged in other configurations such as a parallel or power split type hybrid configuration.

Drive system 12 further includes a conventional transmission assembly 22 which is selectively coupled to crankshaft 18 in a conventional manner (e.g., by use of a conventional clutch assembly). Transmission assembly 22 is operatively coupled to and provides torque and power to the vehicle's driveline 24.

As described more fully and completely below, controller 30 receives signals from sensors 32, and based upon the received signals, controller 30 selectively activates starter/generator 16 to apply forward and reverse torque pulsations to the crankshaft 18 of engine 14, effective to cause rotation through a fraction of an engine cycle, thereby drawing current from and heating the core of battery 34 and conditioning engine bearing lubrication.

In the preferred embodiment of the invention, engine 14 is a conventional internal combustion engine which drivably rotates and delivers torque through crankshaft 18. Electric machine 16 is a conventional integrated starter/generator or starter/alternator unit of the type which is adapted for use in a hybrid electric vehicle. Starter/generator 16 includes a stator assembly 17 and a rotor assembly 15 which is operatively coupled or mounted to crankshaft 18 in a known and conventional manner. Starter/generator 16 selectively provides torque to the crankshaft 18 during certain operating modes, and may also function as a generator to convert drive train energy into electrical energy which is used to charge battery 34 and to electrically power various electrical components of vehicle 10. Battery 34 supplies power to starter/generator 16 and can further be used to recover and store energy during vehicle braking.

Controller 30 includes one or more microprocessors and/or integrated circuits which cooperatively perform the below-described calculations, algorithms, and/or control strategies. In the preferred embodiment of the invention, controller 30 includes a conventional memory unit having both permanent and temporary memory. The memory unit is adapted to and does store at least a portion of the operating software which directs the operation of controller 30. As should also be apparent to those of ordinary skill in the art, controller 30 may actually comprise a plurality of commercially available, conventional, and disparate chips or devices, which are operatively and communicatively linked in a cooperative manner.

Sensors 32 comprise one or more conventional and commercially available sensors which measure information pertaining to engine 14 and battery 34. In the preferred embodiment of the invention, sensors 32 include one or more conventional engine temperature sensors, battery temperature sensors, external climate temperature sensors, door opening sensors, crankshaft speed sensors and crankshaft position sensors. Sensors 32 provide data, such as battery temperature values to controller 30, which utilizes this data, as discussed more fully and completely below, to detect a cold temperature starting condition and to generate torque commands to starter/alternator 16 which draws power from battery 34 in order to heat the core of battery 34.

Figure 2:
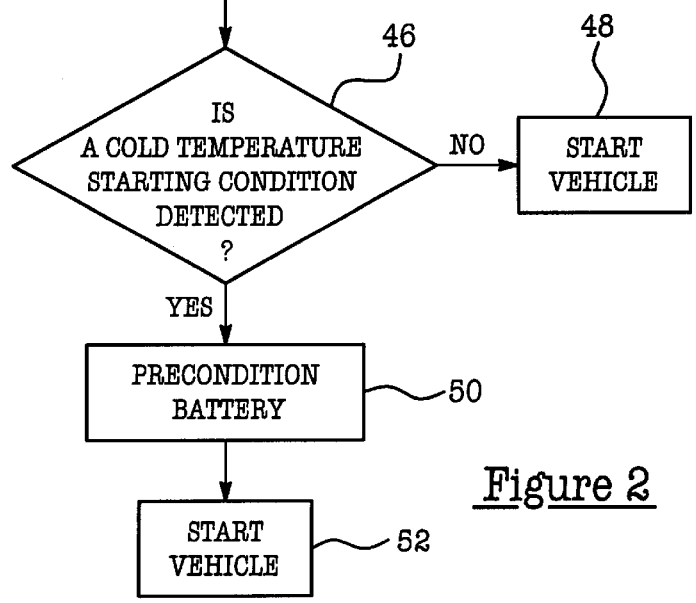
FIG. 2 is a block diagram illustrating a method of preconditioning a battery to improve cold temperature starting within a hybrid electric vehicle and which is performed in accordance with the teachings of the preferred embodiment of the present invention.

Referring now to FIG. 2, there is shown a preferred embodiment of a method or strategy 40 of preconditioning battery 34 in a manner which improves cold temperature starting of hybrid electric vehicle 10. Strategy 40 begins with step 42, where the strategy is enabled within controller 30. Particularly, strategy 40 is enabled when controller 30 determines that battery preconditioning is necessary and more particularly, when controller 30 determines that an attempt to start vehicle 10 is likely to occur. In the preferred embodiment of the invention, this condition is met when controller 30 detects that the driver side vehicle door has been opened or when controller 30 detects that the vehicle doors have been unlocked by use of a remote transmitter or other device. Once the strategy is enabled, controller 30 receives and/or monitors data and/or signals from vehicle sensors 32, as shown in step 44. In other alternate embodiments, controller 30 continuously monitors sensors 32 when vehicle 10 is at rest. Based upon the data received from sensors 32, controller 30 determines whether a "cold temperature" starting condition exists, as shown in step 46. Particularly, controller 30 will detect the existence of a cold temperature starting condition if engine 14 is not running and battery 34 and/or engine 14 are at a relatively low temperature. In the preferred embodiment, a cold temperature starting condition is detected when the measured temperature of battery 34 is less than a predetermined threshold value which in one non-limiting embodiment is equal to zero degrees Celsius. If a cold temperature starting condition is not detected (e.g., if the temperature of battery 34 exceeds the threshold value), controller 30 proceeds to step 48, and the vehicle 10 is started in a conventional manner.

If a cold temperature starting condition is detected in step 46, controller 30 proceeds to step 50, where battery preconditioning is performed prior to starting the vehicle. In step 50, controller 30 sends a command signal to integrated starter/generator 16 to provide torque pulsations to crankshaft 18. Particularly, controller 30 commands alternating torque pulsations in the forward and reverse directions by way of a signal having a certain "duty cycle"(i.e., a percentage of time that the signal is activated). In order to provide the torque commanded by controller 30, starter/generator 16 draws power from battery 34. This power drawn from battery 34 is effective to "self-heat" the battery core as explained more fully and completely below.

Figure 3:
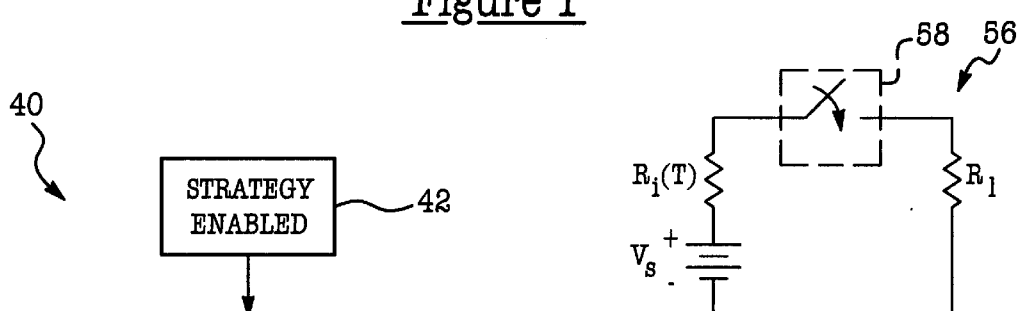
FIG. 3 is a diagram illustrating a circuit which represents the battery and starter/generator circuit of the vehicle shown in FIG. 1.

A diagram 56 representing the circuit between battery 34 and starter/generator 16 is illustrated in FIG. 3. As shown in diagram 56, resistor $R_i(T)$ represents the internal core resistance of battery 34; $V_s$ represents the battery voltage; $R_1$ represents the winding resistance of starter/generator 16; and switch 58 represents the inverting function performed by controller 30. The battery's internal resistance $R_i(T)$ is a strong function of temperature. In the case of advanced batteries (e.g. nickel-metal-hydride batteries) the internal resistance $R_i(T)$ at −40° C. can be more than five times the internal resistance $R_i(T)$ at +25° C.

Figure 4A:
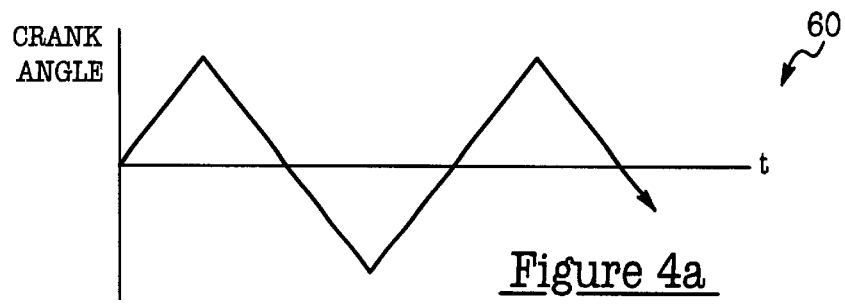
FIG. 4(a) is a graph illustrating the angle of the engine's crankshaft over time in one example of the present invention.
Figure 4B:
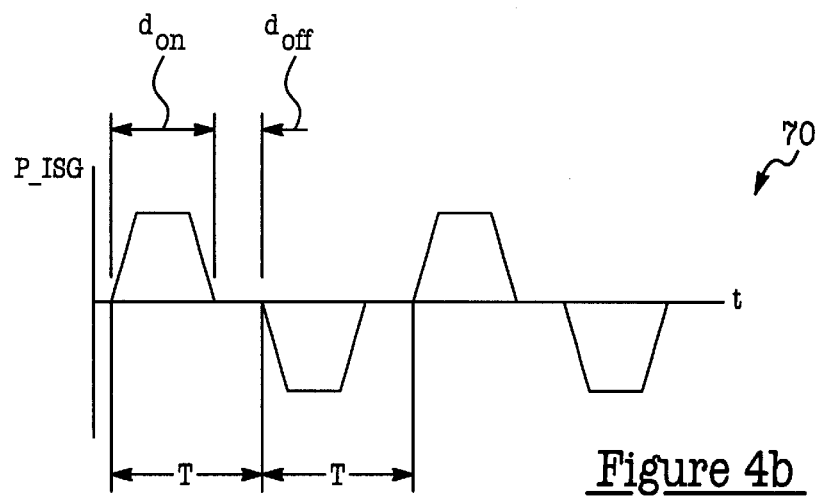
FIG. 4(b) is a graph illustrating the power supplied to the starter/generator over time in one example of the present invention.
Figure 4C:
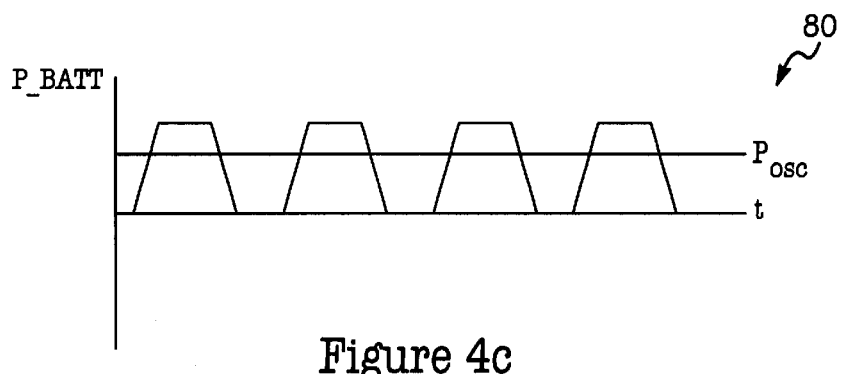
FIG. 4(c) is a graph illustrating the power drawn from the battery by the starter/generator over time in one example of the present invention.

Graphs 60, 70, 80, and 90 illustrated in FIGS. 4(a), (b), (c) and (d) respectively show the crank angle, the starter/generator power ("P_ISG"), the battery power ("P_BATT"), and the battery temperature ("TBATT") over a period of time in one non-limiting example of the present method. As shown in graph 70, controller 30 induces forward and reverse (e.g., positive and negative) power pulsations through starter/generator 16 over consecutive periods of time "T", which in one non-limiting embodiment may be equal to approximately one second. The duty cycle or percent that the control signal is activated per period is referred to as the variable "d" which is equal to $d_{on}/T$, and in the preferred embodiment has a value of about ½ or 0.5. The power or energy which heats the internal core of battery 34 can be represented by the following equation:

$$P_{osc} = P_{total} - P_{ave} \quad (Eq.\ 1);$$

where $P_{total}$ is the total power from battery 34 which generates the forward and reverse rocking motion of crankshaft 18; and where $P_{ave}$ is the average power that is dissipated. Using the conventions of diagram 56, the power or energy which heats the core of battery 34 can be represented by the following equation:

$$P_{osc} = (d*V_s^2)/(R_i(T)+R_1) - (d*V_s)^2/(R_i(T)+R_1) \quad (Eq.\ 2).$$

As should be appreciated by one of ordinary skill in the art, the energy which heats battery core 34 is maximized when d=½ or 0.5.

Figure 4D:
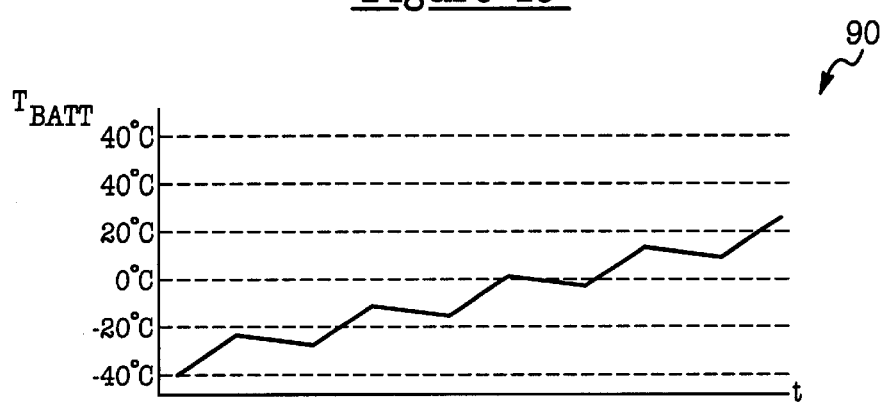
FIG. 4(d) is a graph illustrating the temperature of the battery over time in one example of the present invention.

The heat generated by the induced pulsations increases the temperature of battery 34 as shown in graph 90 of FIG. 4(d). As shown in graph 90, within a few seconds of preconditioning battery 34, the temperature of battery 34 can be desirably increased from −40 degrees Celsius to over 20 degrees Celsius. As should be appreciated by one of ordinary skill in the art, by raising the temperature of battery 34 to between 20 degrees Celsius and 35 degrees Celsius, the pulse power capability of battery 34 is at or near its maximum capacity.

Figure 5:
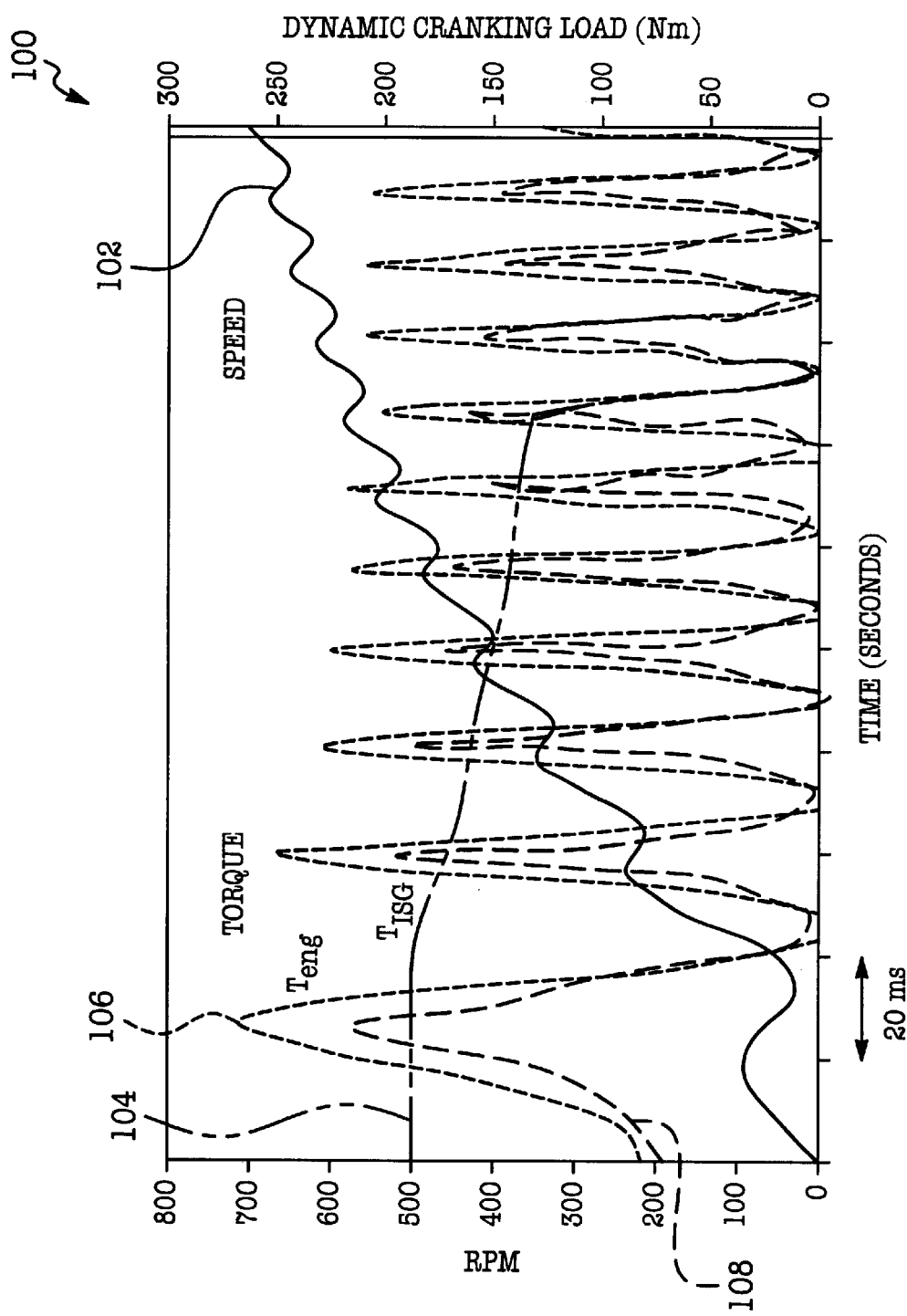
FIG. 5 is a graph illustrating the dynamic cranking load and speed of the engine over time at −40 degrees Celsius.

The "rocking" induced by starter/generator 16 during the preconditioning of battery 34 has the further benefit of removing static friction within the engine bearing, thereby reducing the amount of torque required to crank engine 14. Referring now to FIG. 5, there is shown a graph 100 illustrating the dynamic cranking load or torque required to crank engine 14 at −40 degrees Celsius. In graph 100, curve 102 represents the speed of engine 14; curve 104 represents the torque provided by starter/generator 16 with battery 34 at −40 degrees Celsius; curve 106 represents the normal dynamic cranking load of the engine 14; and curve 108 represents the dynamic cranking load of engine 14 after experiencing the induced rocking motion provided during preconditioning of battery 34. By comparing curve 108 to curve 106, it is apparent that the torque required to crank engine 14 is significantly reduced by the induced forward and reverse cranking motions.

Battery 34 may be preconditioned for a predetermined period of time or until a predetermined battery temperature value is sensed or measured. Once preconditioning has ended, controller 30 proceeds to step 52, and starts the vehicle 10 by use of starter/generator 16. In the preferred embodiment, controller 30 monitors the crank angle (e.g., the angular position of said crankshaft) and position of rotor 15 during preconditioning and uses this information to coordinate and apply fuel and spark within engine 14 at an earlier time within the starting procedure engine 14, thereby reducing the time required to start engine 14.

It should be understood that Applicant's invention is not limited to the exact method 40 which has been described herein, but that various changes and/or modifications may be made without departing from the spirit and/or the scope of Applicant's invention. For example and without limitation, method 40 may include different or additional steps and may perform the disclosed steps and/or other steps in a different order or manner.

What is claimed is:

1. A method for improving cold temperature starting of a vehicle having a battery, an engine and an electric machine which is coupled to said battery and which is attached to the crankshaft of said engine, said method comprising the steps of:

detecting a cold temperature starting condition; and selectively providing torque pulsations to said crankshaft by use of said electric machine during said cold temperature starting condition, said torque pulsations being effective to draw power from said battery effective to heat said battery and to remove static friction within said engine, thereby reducing the torque required to crank said engine.

2. The method of claim 1 wherein said torque pulsations comprise forward and reverse torque pulsations.

3. The method of claim 1 wherein said step of providing torque pulsations to said crankshaft is performed by communicating a signal having a certain duty cycle to said electric machine.

4. The method of claim 3 wherein said certain duty cycle equals approximately fifty percent.

5. The method of claim 1 wherein said electric machine comprises a starter/generator.

6. The method of claim 1 wherein said step of detecting a cold temperature starting condition comprises the steps measuring a temperature of said battery; and comparing the measured temperature to a predetermined value.

7. A method of preconditioning a battery within a vehicle having an engine and a starter/generator which is operatively coupled to said battery and said engine, said method comprising the steps of:

detecting a cold temperature starting condition; and selectively activating said starter/generator effective to draw power from said battery, thereby heating said battery, said selective activation of said starter/generator being further effective to generate torque pulsations to said engine which remove static friction within said engine, thereby reducing the torque required to crank said engine.

8. The method of claim 7 further comprising the step of:
   detecting a door opening within said vehicle.

9. The method of claim 7 wherein said cold temperature starting condition is detected by measuring a temperature of said battery and comparing said measured temperature to a predetermined threshold value.

10. The method of claim 8 wherein said cold temperature starting condition is detected by measuring a temperature of said engine and comparing said measured temperature to a predetermined threshold value.

11. The method of claim 7 wherein said activation of said starter/generator is performed by communicating commands to said starter/generator which cause said starter/generator to selectively generate alternating torque pulsations to said engine in forward and reverse directions.

12. The method of claim 11 wherein said commands have a duty cycle of approximately fifty percent.

13. The method of claim 12 further comprising the steps of:
   monitoring a temperature of said battery; and
   starting said vehicle when said monitored temperature exceeds a predetermined value.

14. A method of preconditioning a battery within a hybrid electric vehicle of the type having an engine, a starter/generator which is operatively coupled to said engine and said battery, and a door, said method comprising the steps of:
   detecting an opening of said door;
   measuring a temperature of said battery;
   comparing said temperature to a predetermined threshold value;
   if said temperature is greater than said predetermined threshold value, starting said vehicle; and
   if said temperature is less than said predetermined threshold value, selectively activating said starter/generator, effective to draw power from said battery and to transmit a torque to said engine, thereby heating said battery and removing static friction from said engine.

15. The method of claim 14 wherein said engine comprises a crankshaft and wherein said starter/alternator is operatively mounted to said crankshaft.

16. The method of claim 15 further comprising the steps of:
   monitoring an angular position of said crankshaft by use of said starter/alternator; and
   utilizing said monitored angular position to apply fuel and spark within said engine.

17. The method of claim 14 wherein said battery comprises a forty-two volt battery.

18. The method of claim 17 wherein said forty-two volt battery comprises a metal-nickel-hydride battery.

* * * * *